May 25, 1965  SEIUEMON INABA ETAL  3,185,439

HYDRAULIC MOTOR CONTROL SYSTEM

Filed July 31, 1963  3 Sheets-Sheet 1

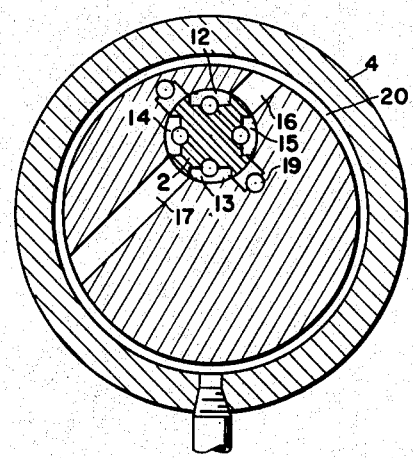
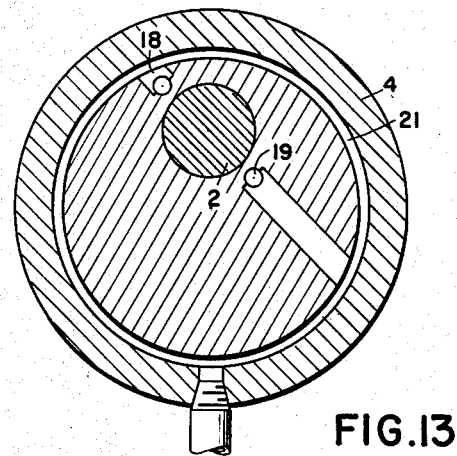
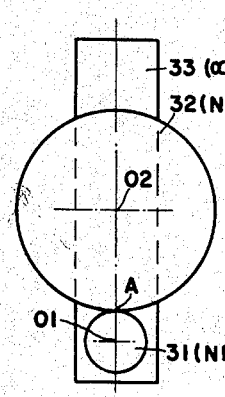
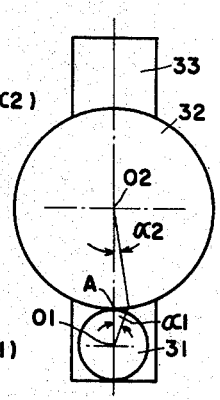
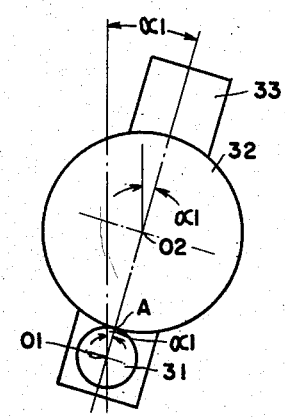

United States Patent Office 3,185,439
Patented May 25, 1965

3,185,439
HYDRAULIC MOTOR CONTROL SYSTEM
Seiuemon Inaba, Kawasaki, Kohei Ito, Fujisawa-shi, and Ryoko Shirafuji, Tokyo, Japan, assignors to Fujitsu Limited, Kawasaki, Japan, a corporation of Japan
Filed July 31, 1963, Ser. No. 299,118
Claims priority, application Japan, Aug. 1, 1962, 37/32,910
5 Claims. (Cl. 253—1)

This invention relates to a hydraulic motor control system, particularly in torque amplifier or follower arrangements.

In such systems, a slight input torque imparted to one member of a pilot valve opens the pilot valve so that pressurized fluid can flow therethrough and rotate a hydraulic motor. A shaft couples the rotating hydraulic motor back to another member of the same pilot valve and, in response to the motor rotation, turns the other member of the valve until the motor has reached the position corresponding to the input torque where the second valve member shuts off the valve and cuts off motor rotation.

The invention, its objects, advantages and features will be more fully described with reference to the accompanying drawings wherein FIG. 1 is a block and partially schematic diagram of a known hydraulic motor control system including a sectional view of a known rotary-type four-way valve;

FIG. 6 is a section VI—VI of FIG. 5;

FIG. 7 is a section VII—VII of FIG. 5;

FIG. 8 is a section VI—VI of FIG. 5 showing the members in a position other than in FIG. 6;

FIGS. 9, 10 and 11 are explanatory diagrams relating to the operation of the system according to the invention;

FIG. 13 is a section XIII—XIII of FIG. 12.

Figure 1:
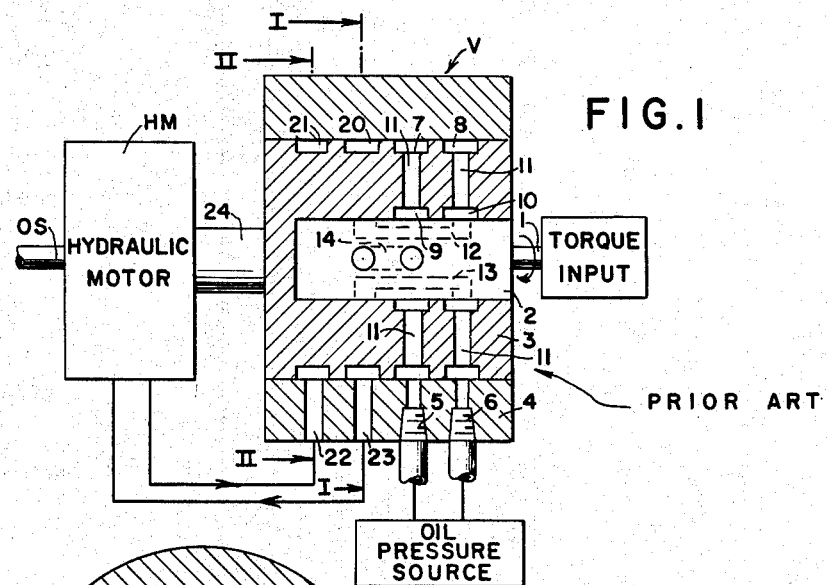
Figure 2:
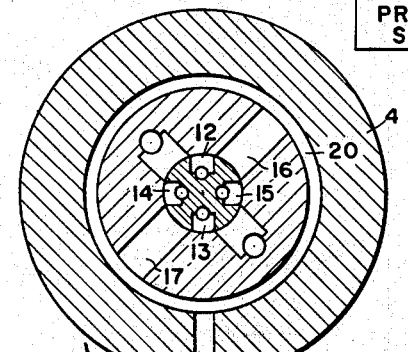
FIG. 2 is a sectional view along the line I—I of FIG. 1.

In FIG. 1 a torque input device TI which for example may be a pulse-responsive electric stepping motor imparts a slight torque by its shaft 1 to turn a pilot valve stem 2 rotatably located within a rotatable sleeve 3 of a pilot valve V. Embracing and holding the rotatable sleeve is a cylindrical housing 4 having two radial bores 5 and 6 connecting respectively to an oil pressure source OP. Communicating with the bores 5 and 6 in the cylinder 4 are two annular grooves 7 and 8 on the outer periphery of the sleeve 3. These grooves further communicate with two grooves 9 and 10 on the interior of sleeve 3 through four radial channels 11. Two diametrically opposite C-shaped bores 12 and 13 starting at locations adjacent the grooves 10 pass through the rotatable stem 2 to two other longitudinally displaced locations within the same radical plane, where they terminate. A C-shaped bore 14 and a C-shaped bore 15 each diametrically opposite each other in the stem 2 starts at the opposite points on groove 9 and terminate in the same radial plane as the grooves 12 and 13. Two radial bores 16 and 17 extend outwardly in the radial plane, defined by the termination of the bores 12, 13, 14 and 15, through the sleeve 3 at the angles shown in FIGS. 2 to 4. These bores terminate at the outer periphery of the sleeve 3 in an annular groove 20. Passing from an outer annular groove 21 on the sleeve 3 to the same radial plane as the other bores 16 and 17 are two Z-shaped bores 18 and 19. The bores 16 and 17 reach the stem at angles perpendicular to the bores 18 and 19 each embracing a segmental portion of the stem surface or land. As shown in FIG. 2, these bores are 45° relative to the bores 11. The grooves 20 and 21 connect through respective bores to a hydraulic motor HM which possesses a shaft 24 keyed to the sleeve 3.

Figure 3:
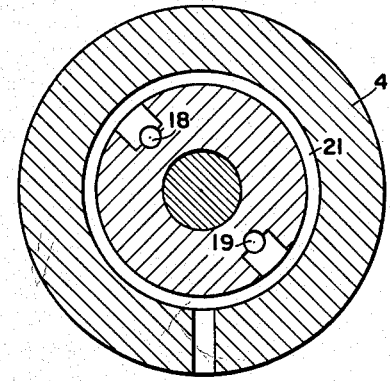
FIG. 3 is a section II—II of FIG. 2.
Figure 4:
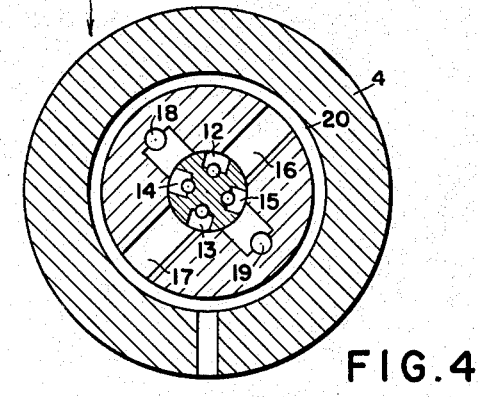
FIG. 4 is a section I—I of FIG. 1 showing the valve members in another position.

When the stem 2 is in the position shown in FIGS. 2 and 3 relative to the sleeve 3, a fluid path exists from the oil pressure source through the bores 5 and 11 to the groove 9 and the bore 14. At the end of the bore 14, however, the fluid path is obstructed by the inner wall of the sleeve 3. Thus no fluid can pass to the hydraulic motor and the valve as well as the motor remains idle. When a slight torque is applied to the valve stem 2 in the direction shown by the arrow, the stem will rotate to the position shown in FIG. 4. At that point fluid can flow through the bores 5, 11, 14 and 15. Since the stem 2 has rotated slightly the bore 14 which had hitherto not been in communication with the bore 18, and the bore 15 which had hitherto not been in communication with the bore 19, pass fluid to these bores (18 and 19) and to the motor HM so as to turn it. Fluid returns through the bores 23, 16 and 17 through the bores 12 and 13 and out the bore 6. The motor HM then turns the shaft 24 and sleeve 3 until coincidence again is maintained between the ends of bores 12, 13, 14 and 15 and the lands on the interior of sleeve 3.

Thus only a slight torque can be used to cause the hydraulic motor to follow the position of the torque input.

As mentioned above, rotation of the power input shaft 1, due to the rotary input TI, will rotate the valve stem 2 so as to perform a regulating control operation through the pressurized oil and return oil. This results in the hydraulic motor HM following the operation of the input torque and the shaft 1. The rotation of the output shaft OS on the hydraulic motor thus corresponds to the rotation of the shaft 1. When the rotary input stops at a particular position, the pilot valve stem 2 stops and the hydraulic motor rotates only until the ports 14, 15, 12 and 13 are adjacent the lands on the interior of valve sleeve 3. Thus the oil to the hydraulic motor is shut off completely.

Such devices according to the prior art are useful for hydraulic motors of medium and small size. If the hydraulic motor becomes quite large, the valve must be made larger to accomodate the flow of oil. However, such large valves require greater torque inputs due to higher flow forces and higher flow speeds and the increase of friction forces resulting from faster circumferential speeds.

On the other hand, the torque input source, which usually constitutes a pulse motor, has a limited torque output. Higher torque input motors have a much slower response. Conversely, a motor intended for quick response provides only a small torque.

If the torque of the torque input TI is increased by a speed step-down gear system, the output motor obviously will not be following the shaft 1 of the torque input source but rather some value proportional thereto, corresponding to the output shaft of the gear system.

It is an object of the invention to provide means permitting a step-up of the torque output which will nevertheless provide in systems of the above type a rapid and accurate response.

According to a feature of our invention, we provide a control system for a hydraulic motor wherein a valve, having a rotatable stem and sleeve, controls the flow of fluid to the hydraulic motor from an oil pressure source, the rotatable valve sleeve being connected to the output of the hydraulic motor, by placing the rotatable valve stem within the rotatable valve sleeve eccentrically, and we connect the valve stem to the shaft of the torque input device through a gear system, while maintaining the shaft of the torque input device concentric with the valve sleeve.

According to another feature of our invention, we provide the valve sleeve with a plurality of valve stems distributed radially about the valve sleeve axis and connect the respective valve shafts protruding out of the respective valve stems to an input motor along the sleeve axis, by means of a planetary gear system.

According to yet another feature of the invention, the input motor to this device is an electronic pulse motor.

Figure 5:
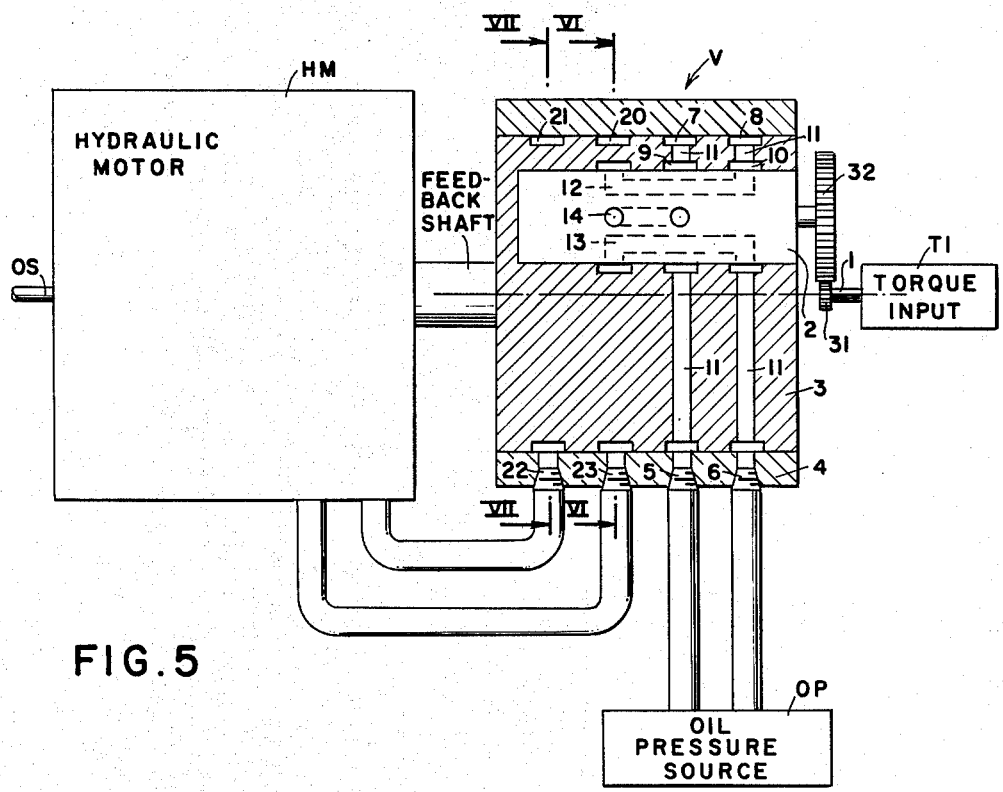
FIG. 5 is a partially schematic and partially block diagram of a system according to the invention.

An example of the valve system according to the invention in connection with the system with which it operates is shown in FIG. 5, FIG. 6, FIG. 7 and FIG. 8, the latter showing cross sections of portions in FIG. 5. The valve V corresponds exactly to the corresponding valve in FIG. 1 except that the valve stem 2 and shaft 1 are located eccentrically within the valve sleeve 3. Connecting the shaft 1 of the torque input TI to the valve stem is a spur gear 31 and a follower gear 32 in a speed step-down arrangement. The shaft 1 of the torque input source still coincides with the axis of sleeve 3. The hydraulic motor HM, the output shaft OS and the lines as well as the oil pressure source correspond to that shown in FIGS. 1 to 4 and operate similarly. More particular details of the valve are shown in FIGS. 7 and 8. Corresponding reference numerals are used for corresponding parts in FIGS. 1 to 4 and 5 to 8.

By virtue of the step-down gear coupling 31, 32 the torque from the torque input may be increased. If the torque were similarly increased in the system shown in FIG. 1, the hydraulic motor simply would not follow the torque input shaft 1. However, in the case of the valve in FIG. 5 this does not occur. The torque input shaft 1 from the torque input motor must be on the axis of the feedback shaft and valve sleeve 3.

The manner in which this operates can be best explained with reference to FIGS. 9, 10 and 11. There, 31 represents the spur gear on a center 01, 32 the follower gear on center 02, the latter being mounted upon a housing 33. The point of engagement between the two gears is designated A. The housing also rotates about the center 01. The vertical axis passes through the center of the gears 31 and 32 as well as the engagement point A. Assume, for example, that the number of teeth on gear 31 is N1 and the number of teeth on gear 32 is N2. If the gear 31 were rotated clockwise from the vertical axis an angle $\alpha 1$ and the housing was maintained in the same position, then the gear 32 would be forced thereby to rotate an angle $\alpha 2$. This is shown in FIG. 10. Thus $-\alpha 1/\alpha 2 = N1/N2$.

If the arm or housing 33 now rotates an angle $\alpha 3$, the following formula will prevail $$-N1/N2 = (\alpha 2 - \alpha 3)/(\alpha 1 - \alpha 3)$$

If, however, the housing 33 now rotates an angle $\alpha 3 = \alpha 1$, as shown in FIG. 11 about the center 01, then the vertical axis of the housing 33 must align itself with the right side of the angle $\alpha 1$, both the gear 31 and the arm 33 having rotated about the center 01 the same number of degrees. Since the center 02 is on the vertical center line, the angular conditions of FIG. 11 prevail.

Substituting $\alpha 3 = \alpha 1 = \alpha = \alpha 2$ in the formula $$-N1/N2 = (\alpha 2 - \alpha 3)/(\alpha 1 - \alpha 3)$$

we obtain a value $-N1/N2 = (\alpha - \alpha)/(\alpha - \alpha) = 0/0$, so that the gear ratio becomes indefinite. Thus if a gear 32 rotatable on a housing 33 is engaged with a driving gear, and the housing 33 can pivot about the center of the driving gear 31, then if the driving gear turns an angle $\alpha$, the initial relative alignment between the driven gear 32 and the housing 33 can be obtained by rotating the housing 33 an angle $\alpha$, regardless of the gear ratio.

The invention is dependent upon the recognition that this initial relative alignment can be achieved regardless of the gear ratio. Assume, for example, that the valve stem 2 is in the position shown in FIGS. 5 and 6. The bores 16, 17, 18 and 19 now coincide with the lands on the valve stem 2. Thus no fluid flows. If now the shaft 1 and gear 31 should turn an angle $\alpha 1$ then the gear 32 would turn a smaller angle $\alpha 2$ and consequently also turn the valve stem 2 an angle $\alpha 2$. This would cause coincidence of the bores in the sleeve and valve stem, thereby permitting flow of oil to the hydraulic motor HM which would turn the sleeve 3 about its axis. However, as the sleeve turns about its axis, i.e., the axis of the torque input shaft 1, it carries with it the valve stem 2. Because of the continued engagement between the gears 31 and 32, the valve stem 2, still turning with the sleeve while the sleeve itself is turning also turns within the sleeve. The motor HM can stop only when the relative alignment between sleeve 3 and stem 2 correspond to the alignment in FIGS. 6, 7. However this alignment depends upon the alignment of gear 32 with the sleeve 3, which alignment will return to its initial condition only after the sleeve has rotated an angle $\alpha 1$. Thus turning of the sleeve is unable to cause realignment between the bores 12, 13, 14 and 15 and the lands in the sleeve until the alignment existing in FIG. 11 is achieved, namely that the sleeve has turned an angle $\alpha 1$.

The rotation of the valve stem 2 caused by rotation of the gear 32 as it turns with the valve sleeve 3 about and in engagement with the spur gear 31, keeps opening the valve stem 1 so that oil pressure keeps flowing until an angle $\alpha 1$ has been reached by the sleeve.

This can otherwise be explained as follows: If the rotating angle of the rotary input is now $\alpha$ the valve stem will turn a valve $-(N1/N2)\alpha$. Pressurized oil from its source will turn the hydraulic motor HM and the feedback shaft as well as the sleeve 3. The output shaft must rotate the sleeve an angle of $+\alpha$ so that the relative angle between the valve stem 2 and the sleeve 3 is 0 so as to close the oil channel ports. Thus the output shaft will follow the input torque shaft which may rotate either in the positive or negative direction.

While the speed step-down ratio of the gears does not affect the operation so far contemplated, it must be limited to prevent over-amplification by the hydraulic motor and resulting oscillation of the system.

The small torque supplied to the gears assure long wear and little breakage.

Figure 12:
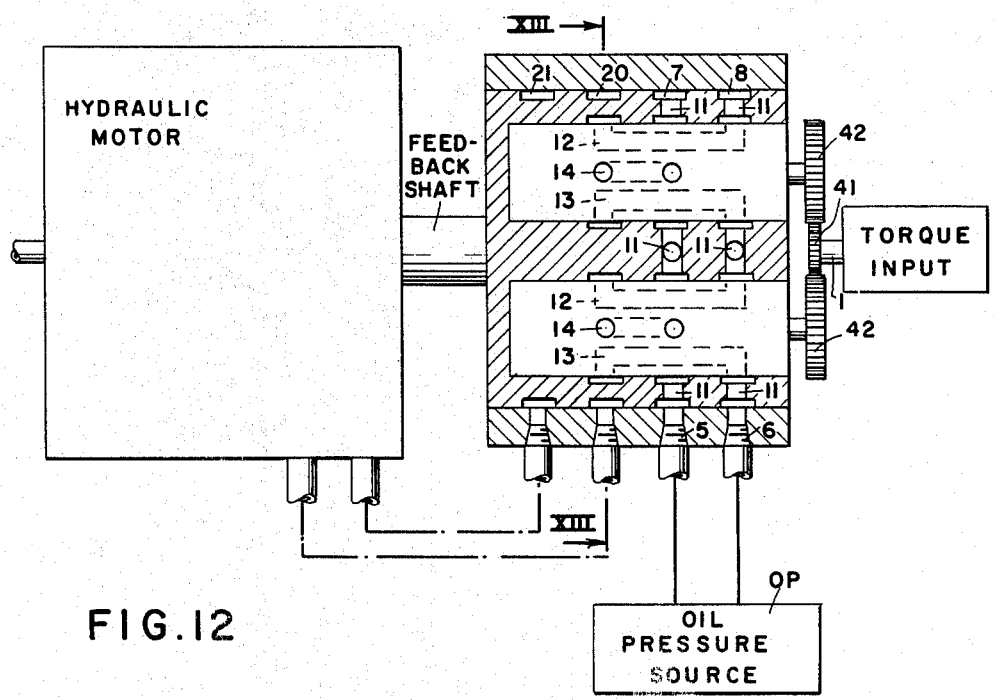
FIG. 12 is a partially schematic and partially block diagram of another system according to the present invention.

If the valve is to be made extremely small, several valve stems may be applied within a single sleeve and gears attached to each valve stem and arranged about the spur gear in a system corresponding to a planetary gear system. This is shown in FIGS. 12 and 13, FIG. 13 showing the planetary gear system and FIG. 12 showing a cross section of the valve. In this case, similar reference numerals have been used to that shown in FIGS. 5 and 1 with the operation corresponding to that shown in FIG. 5. The four rotary-type valve stems are arranged eccentrically within the sleeve so that their respective centers are on a circle concentric with the rotating axis of the sleeve 3. The four planetary gears 42 are coupled to each of the separate valve stems which are geared with the spur gear or sun gear 41. The four valve stems operate within the sleeve identically and the controllable amount of pressured oil may be increased. Of course the number of interior ports in sleeve 3 must be increased to accommodate the extra valve stems. Such additional ports are designated 17' and 19' in FIG. 13. Thus, for controlling the same amount of pressurized oil a smaller valve V may be used or the same size valve may be used to control a greater amount of oil.

While various embodiments of the invention have been described in detail, it will be obvious to those skilled in the art that the invention may be practiced otherwise.

We claim:
1. A hydraulic motor control system comprising hydraulic valve means for controlling the flow of fluid to the hydraulic motor to be controlled, said valve means having a rotatable sleeve member and a stem member rotatably mounted within the sleeve member about an axis parallel to but eccentric with the axis of said sleeve member, the respective position of said members controlling the flow of fluid through said valve means, said sleeve member having coupling means so as to be rotated by the controlled motor, an input shaft adapted to be connected to an input motor and being concentric with the axis of said sleeve member, force step-up means connecting said input shaft to rotate said stem member, and fluid lines on said valve means adapted to be connected to a source of pressurized fluid.

2. A hydraulic motor control system comprising hydraulic valve means for controlling the flow of fluid to the hydraulic motor to be controlled, said valve means having a rotatable sleeve member and a stem member rotatably mounted within the sleeve member about an axis parallel to but eccentric with the axis of said sleeve member, the respective position of said members controlling the flow of fluid through said valve means, said sleeve member having coupling means so as to be rotated by the controlled motor, an input shaft adapted to be connected to an input motor and being concentric with the axis of said sleeve member, a force step-up gear system connecting said input shaft to rotate said stem member, and fluid lines on said valve means adapted to be connected to a source of pressurized fluid.

3. A hydraulic motor control system comprising hydraulic valve means for controlling the flow of fluid to the hydraulic motor to be controlled, said valve means having a rotatable sleeve member and a stem member rotatably mounted within the sleeve member about an axis parallel to but eccentric with the axis of said sleeve member, the respective position of said members controlling the flow of fluid through said valve means, said sleeve member having coupling means so as to be rotated by the controlled motor, an input shaft adapted to be connected to an input motor and being concentric with the axis of said sleeve member, a pinion gear on said input shaft, a follower gear concentric with said stem member and engaging said pinion gear, and fluid lines on said valve means adapted to be connected to a source of pressurized fluid.

4. A hydraulic motor control system comprising hydraulic valve means for controlling the flow of fluid to the hydraulic motor to be controlled, said valve means having a rotatable sleeve member and a plurality of stem members rotatably mounted within said sleeve member at a plurality of eccentric locations radially displaced from the axis of the sleeve member and having respective axes parallel to the axis of the sleeve member, said sleeve member having coupling means so as to be rotated by the controlled motor, an input shaft adapted to be connected to an input motor and being concentric with the axis of said sleeve member, force step-up means connecting said input shaft to rotate said stem members in unison, and fluid lines on said valve means adapted to be connected to a source of pressurized fluid.

5. A hydraulic motor control system comprising hydraulic valve means for controlling the flow of fluid to the hydraulic motor to be controlled, said valve means having a rotatable sleeve member and a plurality of stem members rotatably mounted within said sleeve member at a plurality of eccentric locations radially displaced from the axis of the sleeve member and having respective axes parallel to the axis of the sleeve member, said sleeve member having coupling means so as to be rotated by the controlled motor, an input shaft adapted to be connected to an input motor and being concentric with the axis of said sleeve member, a planetary gear system having a sun gear connected to said input shaft and a plurality of planetary gears each connected to one of said respective stems for rotation therewith, and fluid lines on said valve means adapted to be connected to a source of pressurized fluid.

References Cited by the Examiner
UNITED STATES PATENTS

| | | | |
|---|---|---|---|
| 1,125,639 | 1/15 | Bergesen | 91—375 |
| 1,876,104 | 9/32 | Tucker | 91—375 |
| 2,613,649 | 10/52 | Diebel | 91—375 |
| 3,079,899 | 3/63 | Seiuemon | 91—375 |

FRED E. ENGELTHALER, *Primary Examiner.*